March 30, 1937. R. D. SMITH 2,075,477
GLASS CLOSURE FOR METAL CONTAINERS AND METHOD OF MAKING IT
Filed Feb. 11, 1935
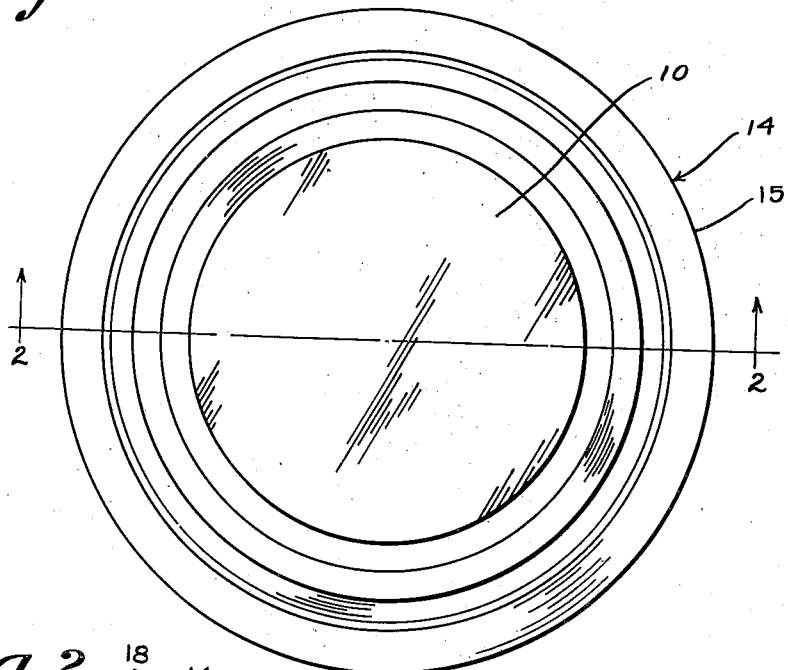
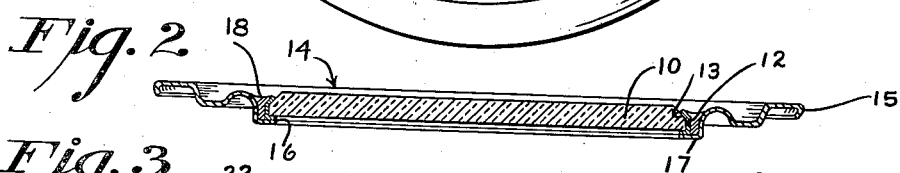
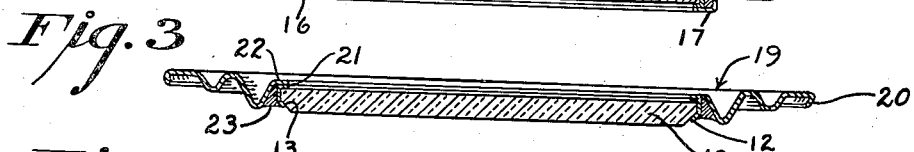
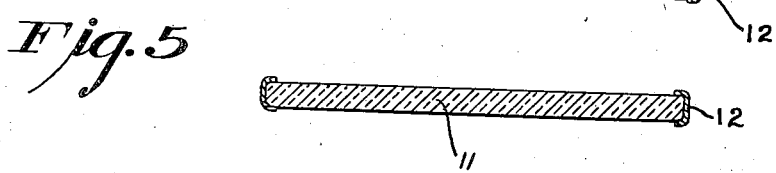
INVENTOR.
ROWLAND D. SMITH
BY Dorsey & Cole
ATTORNEYS.

Patented Mar. 30, 1937

2,075,477

UNITED STATES PATENT OFFICE 2,075,477

GLASS CLOSURE FOR METAL CONTAINERS AND METHOD OF MAKING IT

Rowland D. Smith, Corning, N. Y., assignor to Corning Glass Works, Corning, N. Y., a corporation of New York Application February 11, 1935, Serial No. 6,066

14 Claims. (Cl. 49—81)

This invention, which is a continuation in part of my pending application Ser. No. 636,571, filed October 6, 1932, relates to metal coatings on glass and has for its object to hermetically seal a glass insert into a metal container in a manner suitable for use in the canning industry.

The canning industry is a large and important industry, which uses a very large number of cans each year. Such cans must fulfill a number of requirements, among which is the ability to be sealed on crimping machines with high production and low loss from leakage. The cans must withstand considerable pressure and thermal change in sterilizing or cooking, because the cans, after being filled and sealed at approximately room temperature and atmospheric pressure, are placed in an autoclave and subjected to a steam pressure of about 15 pounds per square inch, which heats the cans and their contents to a temperature in the neighborhood of 260° F., or considerably above the boiling point of water. Obviously, considerable hydrostatic pressure is thus developed within the cans and when the steam pressure is released from the autoclave and the cans are removed therefrom, the internal pressure is thereby further increased and may amount to as much as 35 pounds per square inch before the cans and their contents have cooled. Not more than one leaker in a thousand cans may be tolerated. The all-metal can which is now in use fulfills the above requirements. It has been practically unchanged for many years in spite of many proposed improvements. Since it is composed entirely of metal, its contents are completely hidden until it is opened by the consumer.

It is highly desirable that means be found to render the contents of the cans visible without decreasing the good and valuable qualities of the cans. Containers of glass are used to some extent for products that do not require the cooking and sterilization above referred to, but these are more expensive than the metal containers and, although they can be sealed well enough for some purposes by special methods, they cannot be sealed with the facility and efficiency that characterizes the metal can. Moreover, glass containers are objectionable, due to the frequent chipping of the glass when the container is opened, with the consequent contamination of the contents thereof with fragments and splinters of glass.

The ideal container would be one which combines the transparency of the glass jar with the low cost, the facility of sealing and the resistance to pressure and thermal change that characterizes the metal can. In other words, the ideal container would be the present metal can with an hermetically sealed-in glass insert or window.

Prior proposals for sealing glass inserts into metal cans have not met with commercial success because the seals hitherto suggested are far from being acceptable to the canning industry. Crimping the metal to the glass with cork or rubber gaskets therebetween does not produce a permanent seal nor one which will withstand the pressure and thermal change incident to sterilizing and cooking. Molding or casting the glass integral with the metal part is not successful on account of the difficulty of producing by this means an article which is sufficiently free from strain to withstand pressure and thermal change. Soldering the glass into the container has likewise proved unsuccessful, largely because prior soldering methods have not produced a seal in which the metal was sufficiently well bonded to the glass to prevent its being stripped loose when subjected to high pressure.

In soldering glass hermetically to metal, it is necessary first to prepare a metal coating which is permanently incorporated with the surface of the glass and which will readily be wet by the solder. Prior methods of metallizing glass do not produce a coating which is satisfactory for my purpose. This is due not only to the kind of glass that has been employed but also to the metallizing composition itself. Metal lusters and burnish pastes have long been used for producing fired-on decorative coatings on ordinary glass, but such metallized coatings are not readily wet by solder and are not sufficiently well bonded to the glass to answer the above requirements. Lusters and burnish pastes comprise easily reducible metals, such as platinum, gold or silver, or salts thereof mixed with a small amount of lead borate flux and a vehicle such as lavender oil. When coatings, that are formed by firing lusters or burnish pastes onto glass, are subsequently plated with copper they may be soldered, but I have found that such seals are not uniformly and infallibly hermetic because they are not sufficiently well bonded to the glass.

I have discovered that metallized coatings are more adherent the higher the temperature at which they are fired in and I have found that low expansion borosilicate glasses will form a better bond with the metallized coating than ordinary glasses. Although this may be due to some extent to a greater affinity of borosilicate glasses for the metal and/or the flux through which it bonded to the glass, I believe that it is due chiefly to the fact that such low expansion glasses can be fired to higher temperatures than ordinary glasses. I have found that a firing temperature of about 620° C. for a half hour or more is desirable for producing my metallized glass inserts although it is to be understood that temperatures as low as 600° C. may be used, provided the time of firing is greatly increased and also that temperatures higher than this may be employed for shorter lengths of time. As an example of glasses that are particularly suitable for my purpose, I refer to the glass $B_1$ of the Sullivan and Taylor Patent No. 1,304,623.

I have also discovered an improved composition for metallizing glass, as will later be described, which contains lead fluoride, barium fluoride, or barium borate, and an easily reducible metal, such as silver. Seals made by employing my metallizing composition on borosilicate glass of the type referred to, and at the temperature mentioned, possess such tenacity and intimacy of bond that the metal cannot be separated from the glass without tearing or rupturing it.

I have further discovered that a vertically soldered joint or butt joint does not provide a sufficient factor of safety, because solder is relatively soft and a seal which is joined only to the outer edge of the glass shears too easily when the can is subjected to high pressure. By metallizing the glass insert as described, not only on the edge but also for a short distance inwardly on its faces and by building up the soldered joint so that the solder forms a fillet connecting the faces as well as the edge of the glass insert with the adjacent container, I have found that I can produce a can top which will withstand the most severe treatment to which it may be subjected in the canning and preservation of foodstuffs. This is accomplished by metallizing the glass by my improved method so that the metal extends wholly around the outer edge of the periphery of the glass insert and overlies opposite faces thereof for a short distance, say about one-sixteenth of an inch. In order to avoid any projection of the solder fillet above the plane of the can top and to effect a wedging action of the fillet between the glass and the metal frame into which the latter is to be soldered, I prefer to bevel the edge of the glass insert. Although I do not wish to be limited to the beveled edge, I recognize the value of such wedging action when the can is subjected to internal pressures because instead of producing a tearing and shearing action on the solder fillet, such pressure produces a wedging effect between the glass and the metal frame which places the fillet under compression and tends thereby to improve the sealing qualities of the joint.

My invention, therefore, consists of a novel glass-containing closure for a metal can and method of making it to be more fully described herein, claimed in the appended claims, and illustrated in the accompanying drawing which illustrates the preferred embodiment of my invention and in which:

Fig. 1 is a plan view of a glass closure in the form of a beveled glass disc soldered into the top for a tin can in accordance with my invention;

Fig. 2 is a sectional view on the line 2—2 of Fig. 1, the metallized layer on the edge of the disc being exaggerated for the purpose of illustration;

Fig. 3 is a sectional view of a modified form of glass closure in accordance with my invention, the metallized layer on the edge of the disc being exaggerated for the purpose of illustration;

Fig. 4 is a sectional view of a glass disc having its periphery beveled and metallized in accordance with my invention, the metallized layer on the edge of the disc being exaggerated for the purpose of illustration; and Fig. 5 is a sectional view of an alternative type of glass disc having its periphery metallized in accordance with my invention, the metallized layer on the edge of the disc being exaggerated for the purpose of illustration.

In practicing my invention a glass disc 10 (Fig. 4) and, alternatively, a glass disc 11 (Fig. 5) are provided on their peripheries with a metallized coating 12 which extends wholly around the outer edge of the peripheries and overlies the opposite faces thereof for a distance of about one-sixteenth of an inch. The disc 10 is further provided with a bevel 13.

In its preferred form as shown in Figs. 1 and 2, my invention further consists of a metal can top designated generally 14 having an edge crimp 15 and an opening 16 into which the disc 11 is disposed on a flange 17 which projects radially from the wall of the opening for a distance approximately equal to and corresponding with the inwardly extending metal coating 12 on the plane side of the disc. A layer of solder unites the metallized coating 12 with the flange 17 and the wall of the opening 16 and forms a wedge shaped fillet 18 between the wall and the periphery 13.

In Fig. 3 I have shown an alternative form of my invention comprising a can top 19 with edge crimp 20 and opening 21 into which the disc 10 is inserted in an inverted position so that the metallized edge of its plane face contacts a flange 22 which extends radially from the upper edge of the opening 21. A layer of solder unites the metallized coating 12 with the flange 22 and the wall of the opening 21 and forms a wedge shaped fillet 23 between the wall and the beveled periphery 13.

In forming the metal coating 12 I have found that I can bond the metal to the glass in a manner which meets the requirements of the canning industry, by using a metallizing composition which contains an easily reducible metal and a flux containing lead fluoride, barium fluoride or barium borate, or mixtures thereof. Easily reducible metals, as the term is used herein, comprise the noble metals platinum, gold, and silver. Silver is particularly suitable for my purpose. By means of my special flux I am able to metallize glass with silver or other easily reducible metal at moderate temperatures with an increased degree of adherence between glass and metal and an improvement of chemical stability over that obtained with the prior lead borate flux.

In my aforesaid pending application I have shown that when lead fluoride is added to a silvering composition, which contains lead borate flux and the same is applied to glass and fired on in the usual manner, the bond between glass and metal is mechanically stronger and chemically more stable than that obtained through the use of prior metallizing compositions. Although lead borate and lead fluoride each have a fusing point somewhat in excess of 800° C., I have found that a mixture of the two has a fusing point which is lower than that of either one alone and when the two materials are mixed in the proper proportions the product forms an eutectic mixture, that is, a mixture of minimum melting point. Since the lead fluoride is not only very corrosive to crucibles of all sorts but tends to decompose when heated with lead borate, thereby losing some of the fluorine, it is difficult to determine the exact melting point of any particular mixture. However, as nearly as can be determined, the eutectic corresponds approximately to a mixture of equal parts by weight of lead borate, Pb(BO₂)₂, and lead fluoride PbF₂, and the melting point of the eutectic mixture is in the neighborhood of 300° C.

I have further investigated the effect of various other metallic fluorides on the properties of metallizing compositions and on the strength of bond thus to be obtained between glass and metal. I have now found that barium fluoride, when used as the flux in a metallizing composition, combined with lead borate or barium borate, will produce as good or better results than lead fluoride. I have further found that barium borate, when used alone, or in combination with lead borate as the flux, is suitable for my purpose and will produce a better result than prior compositions containing lead borate flux.

In practicing my invention I first prepare a metallizing composition in accordance with my discoveries. For small jobs or in case the amount of metallizing to be done is relatively small, I may have recourse to a commercial metallizing composition which I modify in accordance with my invention. Various metallizing compositions are available commercially, in the form of pastes and liquids, which usually contain an easily reducible metal or salt thereof together with a flux such as lead borate, thallium borate, bismuth subnitrate or the like and a suitable vehicle such as lavender oil. One of these which I have found suitable for my purpose consists approximately of 65% powdered silver, 3.5% lead borate, 1.5% bismuth subnitrate and 30% organic vehicle. To such a commercial metallizing composition I add preferably about 10% of lead fluoride or barium fluoride or barium borate. This has the effect of increasing the mechanical strength and stability of the glass to metal bond when such composition is applied to glass and fired in. Although I prefer the proportion named above, I do not wish to be limited thereby, since the use of smaller or larger amounts of my new fluxes will produce at least some of the benefits of my invention.

For metallizing on a large scale I find it economical and preferable to prepare a metallizing composition as follows: For example, about 12 parts by weight of silver carbonate are mixed with one part by weight of my flux and sufficient lavender oil or other suitable organic vehicle is added to form a paste. The flux in this case may consist of equal parts of lead borate and lead fluoride, or barium borate and lead fluoride, or lead borate and barium fluoride, or barium borate and barium fluoride, or barium borate alone. In lieu of silver carbonate, I may use the oxide or the finely powdered metal and instead of silver I may use other easily reducible metals, but I prefer to use silver carbonate. Other proportions of metal to flux may be used, but for my purpose I prefer the above mentioned 12 to 1 ratio.

The metallizing composition is applied to the periphery of the glass disc 10 or 11, preferably by means of a brush, while the disc is being rotated. The coated disc is then heated to about 620° C. at a rate not fast enough to crack the glass or cause bubbling of the liquid vehicle, which will rapidly evaporate. After heating at 620° C., for about one-half hour or more, the disc is cooled at a proper rate to anneal it and the metal coating is found to be so firmly attached to the surface thereof that it cannot be removed mechanically without rupturing or tearing the glass.

The metallized surface is then electroplated with copper. The electro-deposition of copper is accomplished in the usual manner as, for example, by making the metallized surface the cathode in a plating bath comprising water and about six ounces by weight of 98% sulphuric acid and about 32 ounces of commercial copper sulphate per gallon of water. A current density of about 15 amperes per square foot is applied for a sufficient length of time to form a thin coating of copper over the silver. Glass which has thus been metallized and copper plated may be soldered to with the same ease and facility of solid copper and any flux may be used which is suitable for use with this metal.

The plating step furnishes a convenient means for determining whether or not a disc has been properly metallized because if, as sometimes happens, a flaw has developed at any part of the metallized layer, the surface will not plate uniformly and a perfect solder seal may not be obtained. Therefore, discs which do not plate uniformly are discarded as imperfect.

In soldering the metallized disc into a metal container, such as the can top 14 or 19, the disc 10 is placed in the opening 16 or 21 in the can top so that the metallized under surface of the disc coincides with and covers the projecting flange 17 or 22, the modified closure shown in Fig. 3 being inverted during this procedure. The assembly is then placed over a hot plate, soldering flux is applied either before or after heating and, when it is sufficiently hot, solder is introduced to fill the space between the disc and the edge of the recess extending beneath the disc to join its metallized under surface with the flange 17 or 22 and extending above the bevel of the disc to form the fillet 18 or 23.

The disc 11 (Fig. 5) may be substituted in lieu of the disc 10 in the can top 14 or 19.

In the claims 2, 3, 5, 6, 9 and 10 the term "a borate" will be understood to include only a borate of lead or of barium or mixtures thereof.

I claim:

1. The method of making a glass insert for a metal container, which includes applying to the periphery of the insert a metallizing composition which contains a flux of the group comprising lead fluoride, barium fluoride and barium borate, firing the glass insert to incorporate therewith a thin coating of metal extending wholly around the outer edge of the periphery and overlying the opposite faces thereof for about one-sixteenth of an inch, and plating the metal coating with another metal which is easily wet by solder.

2. The method of making a glass insert for a metal container, which includes applying to the periphery of the insert a metallizing composition which contains lead fluoride and a borate, firing the disc to incorporate with the surface a thin coating of the metal extending wholly around the outer edge of the periphery and overlying the opposite faces thereof for about one-sixteenth of an inch, and plating the metal coating with another metal which is easily wet by solder.

3. The method of making a glass insert for a metal container, which includes applying to the periphery of the insert a metallizing composition which contains barium fluoride and a borate, firing the disc to incorporate with the surface a thin coating of the metal extending wholly around the outer edge of the periphery and overlying the opposite faces thereof for about one-sixteenth of an inch, and plating the metal coating with another metal which is easily wet by solder.

4. The method of making a glass insert for a metal container, which includes applying to the periphery of the insert a metallizing composition which contains barium borate, firing the disc to incorporate with the surface a thin coating of the metal extending wholly around the outer edge of the periphery and overlying the opposite faces thereof for about one-sixteenth of an inch, and plating the metal coating with another metal which is easily wet by solder.

5. The method of making a glass insert for a metal container, which includes applying to the periphery of the insert a metallizing composition which contains silver, lead fluoride and a borate, firing the disc to incorporate with the surface a thin coating of silver extending wholly around the outer edge of the periphery and overlying the opposite faces thereof for about one-sixteenth of an inch, and plating the silver with copper.

6. The method of making a glass insert for a metal container, which includes applying to the periphery of the insert a metallizing composition which contains silver, barium fluoride and a borate, firing the disc to incorporate with the surface a thin coating of silver extending wholly around the outer edge of the periphery and overlying the opposite faces thereof for about one-sixteenth of an inch, and plating the silver with copper.

7. The method of making a glass insert for a metal container, which includes applying to the periphery of the insert a metallizing composition which contains silver, a barium borate, firing the disc to incorporate with the surface a thin coating of silver extending wholly around the outer edge of the periphery and overlying the opposite faces thereof for about one-sixteenth of an inch, and plating the silver with copper.

8. The method of making an hermetically sealed joint between a metal container and a glass insert, which includes applying to the periphery of the insert a metallizing composition which contains a flux of the group comprising lead fluoride, barium fluoride and a barium borate, firing the glass insert to incorporate therewith a thin coating of metal extending wholly around the outer edge of the periphery and overlying the opposite faces thereof for about one-sixteenth of an inch, plating the metal coating with another metal which is easily wet by solder and soldering the insert into a recessed opening in the container so that the solder unites the wall and bottom of the recess with the metal coating of the insert and forms a wedge-shaped fillet between the wall of the recess and the periphery.

9. The method of making an hermetically sealed joint between a metal container and a glass insert, which includes applying to the periphery of the insert a metallizing composition which contains silver, lead fluoride and a borate, firing the disc to incorporate with the surface a thin coating of silver extending wholly around the outer edge of the periphery and overlying the opposite faces thereof for about one-sixteenth of an inch, and plating the silver with another metal which is easily wet by solder, and soldering the insert into a recessed opening in the container so that the solder unites the wall and bottom of the recess with the metal coating of the insert and forms a wedge-shaped fillet between the wall of the recess and the periphery.

10. The method of making an hermetically sealed joint between a metal container and a glass insert, which includes applying to the periphery of the insert a metallizing composition which contains silver, barium fluoride and a borate, firing the disc to incorporate with the surface a thin coating of silver, extending wholly around the outer edge of the periphery and overlying the opposite faces thereof for about one-sixteenth of an inch, and plating the silver with another metal which is easily wet by solder, and soldering the insert into a recessed opening in the container so that the solder unites the wall and bottom of the recess with the metal coating of the insert and forms a wedge-shaped fillet between the wall of the recess and the periphery.

11. The method of making an hermetically sealed joint between a metal container and a glass insert, which includes applying to the periphery of the insert a metallizing composition which contains silver and barium borate, firing the disc to incorporate with the surface a thin coating of silver extending wholly around the outer edge of the periphery and overlying the opposite faces thereof for about one-sixteenth of an inch, and plating the silver with another metal which is easily wet by solder, and soldering the insert into a recessed opening in the container so that the solder unites the wall and bottom of the recess with the metal coating of the insert and forms a wedge-shaped fillet between the wall of the recess and the periphery.

12. The method of making an hermetically sealed joint between a metal container and a glass insert, which includes applying to the periphery of the insert a metallizing composition which contains about 12 parts by weight of silver carbonate and one part by weight of barium borate and an organic vehicle, firing the disc at about 620° C. for about one-half hour to produce a coating of silver extending wholly around the outer edge of the periphery and overlying the opposite faces thereof for about one-sixteenth of an inch, and plating the silver with copper, and soldering the insert into a recessed opening in the container so that the solder unites the wall and bottom of the recess with the metal coating of the insert and forms a wedge-shaped fillet between the wall of the recess and the periphery.

13. The method of making an hermetically sealed joint between a metal container and a glass insert, which includes applying to the periphery of the insert a metallizing composition which contains about 12 parts by weight of silver carbonate, .5 parts by weight of lead fluoride, .5 parts by weight of lead borate, and an organic vehicle, firing the disc at about 620° C. for about one-half hour to incorporate with the surface a thin coating of silver extending wholly around the outer edge of the periphery and overlying the opposite faces thereof for about one-sixteenth of an inch, and plating the silver with copper, and soldering the insert into a recessed opening in the container so that the solder unites the wall and bottom of the recess with the metal coating of the insert and forms a wedge-shaped fillet between the wall of the recess and the periphery.

14. The method of making an hermetically sealed joint between a metal container and a glass insert, which includes applying to the periphery of the insert a metallizing composition which contains about 12 parts by weight of silver carbonate, .5 parts by weight of barium fluoride, .5 parts by weight of barium borate, and an organic vehicle, firing the disc at about 620° C. for about one-half hour to incorporate with the surface a thin coating of silver extending wholly around the outer edge of the periphery and overlying the opposite faces thereof for about one-sixteenth of an inch, and plating the silver with copper, and soldering the insert into a recessed opening in the container so that the solder unites the wall and bottom of the recess with the metal coating of the insert and forms a wedge-shaped fillet between the wall of the recess and the periphery.

ROWLAND D. SMITH.